United States Patent
Choi et al.

(10) Patent No.: US 9,856,567 B2
(45) Date of Patent: Jan. 2, 2018

(54) SYNTHESIS OF HIGH-SURFACE-AREA NANOPOROUS BIVO₄ ELECTRODES

(71) Applicant: Wisconsin Alumni Research Foundation, Madison, WI (US)

(72) Inventors: Kyoung-Shin Choi, Fitchburg, WI (US); Tae Woo Kim, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 321 days.

(21) Appl. No.: 14/305,064

(22) Filed: Jun. 16, 2014

(65) Prior Publication Data
US 2015/0361566 A1 Dec. 17, 2015

(51) Int. Cl.
C25B 11/00 (2006.01)
C25B 11/03 (2006.01)
C25B 1/04 (2006.01)
C25B 1/00 (2006.01)
(Continued)

(52) U.S. Cl.
CPC ............ *C25B 11/035* (2013.01); *C01G 31/00* (2013.01); *C25B 1/003* (2013.01); *C25B 1/04* (2013.01); *C25B 11/04* (2013.01); *C01P 2004/03* (2013.01); *C01P 2004/51* (2013.01); *C01P 2004/62* (2013.01); *C01P 2004/80* (2013.01); *C01P 2006/12* (2013.01); *C01P 2006/14* (2013.01); *C01P 2006/16* (2013.01); *C01P 2006/17* (2013.01); *C01P 2006/40* (2013.01); *Y02E 60/366* (2013.01); *Y02P 20/135* (2015.11)

(58) Field of Classification Search
CPC ....... C25B 11/035; C25B 11/04; C25B 1/003; Y02P 20/135; C01P 2004/51; C01P 2004/03; C01P 2004/80; C01P 2006/17; C01P 2006/16; C01P 2006/14; C01P 2004/62; C01P 2006/12; C01P 2006/40; C01G 31/00
See application file for complete search history.

(56) References Cited

U.S. PATENT DOCUMENTS

2009/0211906 A1* 8/2009 Sugaya ............... G01N 27/4075
204/424
2009/0311169 A1* 12/2009 Rajeshwar ............ C01G 29/00
423/606
(Continued)

FOREIGN PATENT DOCUMENTS

CN    101775615 B  *  2/2012

OTHER PUBLICATIONS

Saito, Rie, Yugo Miseki, and Kazuhiro Sayama. "Highly efficient photoelectrochemical water splitting using a thin film photoanode of BiVO 4/SnO 2/WO 3 multi-composite in a carbonate electrolyte." Chemical Communications 48.32 (2012): 3833-3835.*
(Continued)

Primary Examiner — Richard M Rump
(74) Attorney, Agent, or Firm — Bell & Manning, LLC

(57) ABSTRACT

Photoelectrochemical materials and photoelectrodes comprising the materials are provided. The photoelectrochemical materials comprise a porous, high-surface-area $BiVO_4$ that is composed of particles smaller than the hole diffusion length of $BiVO_4$.

20 Claims, 7 Drawing Sheets

(51) Int. Cl.
*C25B 11/04* (2006.01)
*C01G 31/00* (2006.01)

(56) References Cited

U.S. PATENT DOCUMENTS

2010/0155218 A1* 6/2010 Vogt ............... B01J 35/004
204/157.15
2014/0294721 A1* 10/2014 Feng ............... C01G 49/06
423/594.7

OTHER PUBLICATIONS

Su, Jinzhan, et al. "Nanostructured WO3/BiVO4 heterojunction films for efficient photoelectrochemical water splitting." Nano letters 11.5 (2011): 1928-1933.*

Sayama, Kazuhiro, et al. "Photoelectrochemical decomposition of water into H2 and O2 on porous BiVO4 thin-film electrodes under visible light and significant effect of Ag ion treatment." The Journal of Physical Chemistry B 110.23 (2006): 11352-11360.*

Yao, Mingming, et al. "Monoclinic mesoporous BiVO 4: Synthesis and visible-light-driven photocatalytic property." Colloids and Surfaces A: Physicochemical and Engineering Aspects 433 (2013): 132-138.*

Wang M., et al. Characterization and photocatalytic properties of N-doped BiVO4 synthesized via a sol-gel method Journal of Alloys and Compounds (2013), 548, 70-76.*

Cheng, Yongliang, et al. "Preparation of porous BiVO 4 fibers by electrospinning and their photocatalytic performance under visible light." RSC Advances 3.43 (2013): 20606-20612.*

Dong, Lu, et al. "Structuring porous "sponge-like" BiVO 4 film for efficient photocatalysis under visible light illumination." Journal of colloid and interface science 393 (2013): 126-129.*

Li, Guisheng, Dieqing Zhang, and Jimmy C. Yu. "Ordered mesoporous BiVO4 through nanocasting: a superior visible light-driven photocatalyst." Chemistry of Materials 20.12 (2008): 3983-3992.*

Xi, Guangcheng, and Jinhua Ye. "Synthesis of bismuth vanadate nanoplates with exposed {001} facets and enhanced visible-light photocatalytic properties." Chemical Communications 46.11 (2010): 1893-1895.*

McDonald et al., A new electrochemical synthesis route for a BiOI electrode and its conversion to a highly efficient porous BiVO4 photoanode for solar water oxidation, Energy Environ. Sci., vol. 5, 2012, pp. 8553-8557.

Seabold et al., Efficient and Stable Photo-Oxidation of Water by a Bismuth Vanadate Photoanode Coupled with an Iron Oxyhydroxide Oxygen Evolution Catalyst, J. Am. Chem.Soc., vol. 134, Jan. 20, 2012, pp. 2186-2192.

Park et al., Progress in bismuth vanadate photoanodes for use in solar water oxidation, Chem. Soc. Rev., vol. 42, Oct. 23, 2012, pp. 2321-2337.

Kim et al., Nanoporous BiVO4 Photoanodes with Dual-Layer Oxygen Evolution Catalysts for Solar Water Splitting, Science, vol. 343, Feb. 28, 2014, pp. 990-994.

Wei et al., Photoelectrochemical Cell and Its Applications in Optoelectronics, Int. J. Electrochem. Sci., vol. 2, Oct. 20, 2007, pp. 897-912.

* cited by examiner

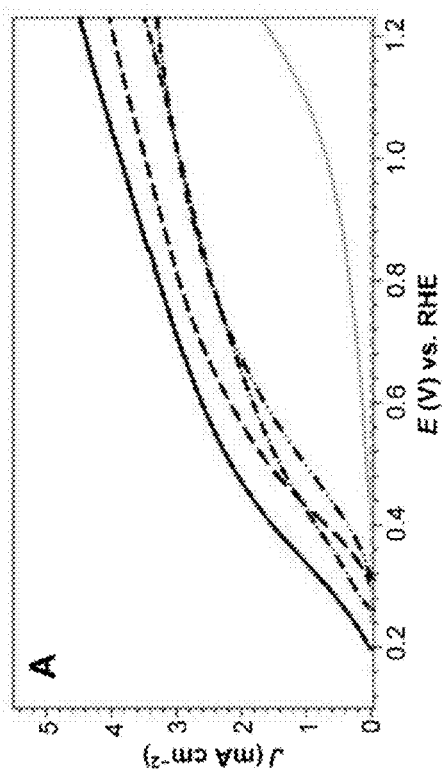
FIG. 3A
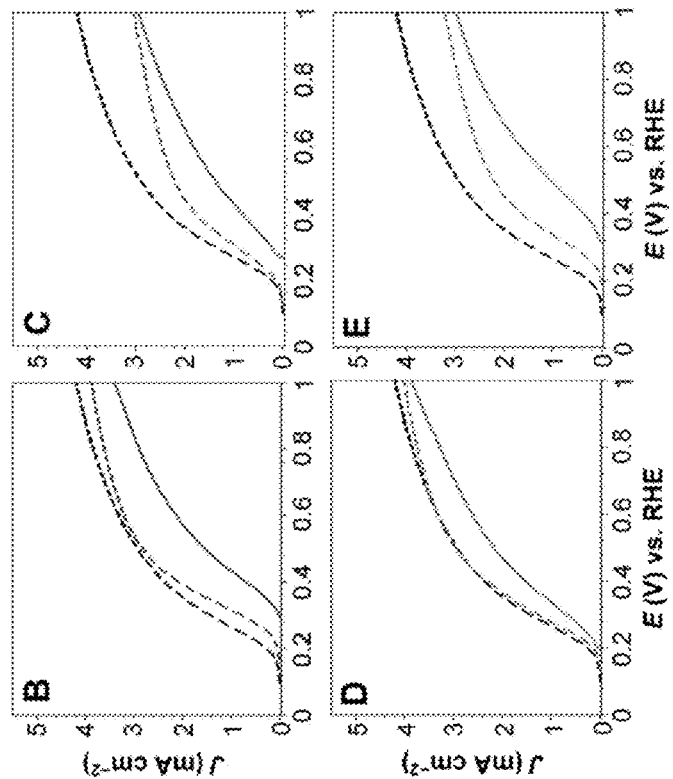
FIG. 3B
FIG. 3C
FIG. 3D
FIG. 3E

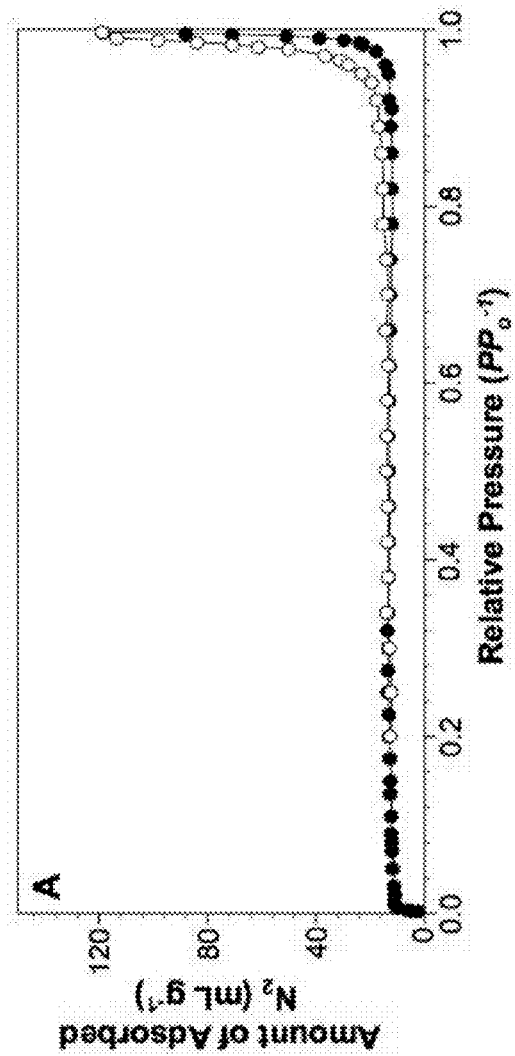
FIG. 6A
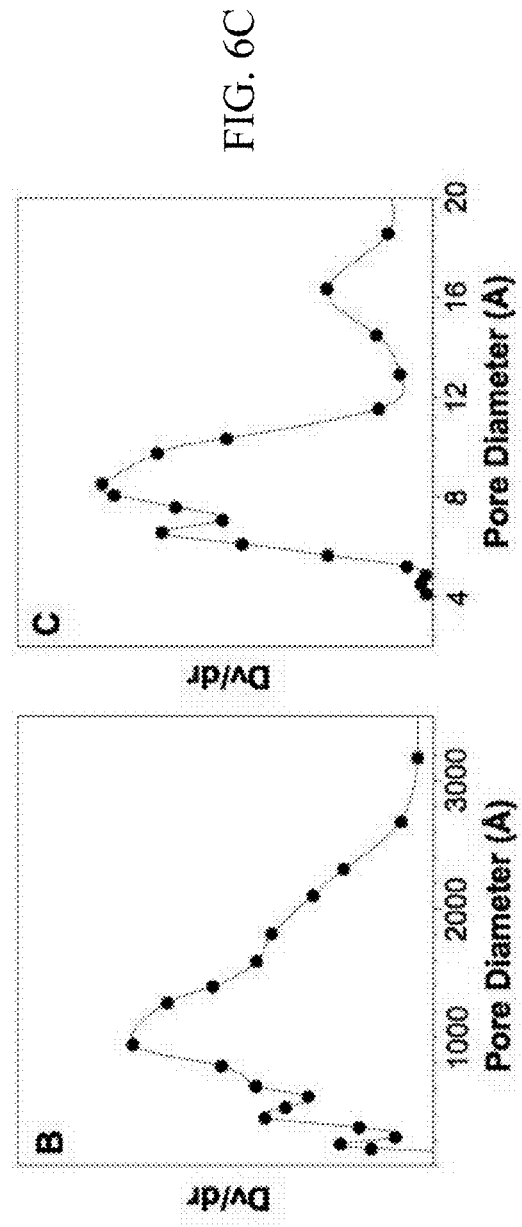
FIG. 6B
FIG. 6C

SYNTHESIS OF HIGH-SURFACE-AREA NANOPOROUS BiVO$_4$ ELECTRODES

REFERENCE TO GOVERNMENT RIGHTS

This invention was made with government support under 1305124 awarded by the National Science Foundation. The government has certain rights in the invention.

BACKGROUND

N-type bismuth vanadate (BiVO$_4$) has recently emerged as a promising photoanode for use in water-splitting photoelectrochemical cells because it absorbs a substantial portion of the visible spectrum and has a favorable conduction band (CB) edge position very near the thermodynamic H$_2$ evolution potential. However, the solar-to-hydrogen conversion (STH) efficiency achieved with BiVO$_4$ to date has been far below what is expected because the material suffers from poor electron-hole separation yield ($\varphi_{sep}$). Previous efforts to improve the $\varphi_{sep}$ of BiVO$_4$ mainly focused on doping studies, which were intended to improve its poor electron transport properties.

A porous BiVO$_4$ material has been made by applying V$_2$O$_5$ dissolved in aqueous NH$_4$OH solution onto a BiOI substrate, followed by conversion to BiVO$_4$. However, because the hydrophilic V$_2$O$_5$-containing solution could not wet the hydrophobic surface of BiOI, the resulting BiVO$_4$ electrodes were composed of large submicron size particles, limiting the surface area and photoelectrochemical performance of the material. (See McDonald et al., *Energy Environ. Sci.* 5, 8553-8557 (2012).)

SUMMARY

Photoelectrochemical materials and photoelectrodes comprising the materials are provided. Also provided are photoelectrochemical cells (PECs) and methods for using the photoelectrochemical cells.

One embodiment of a photoelectrochemical material comprises a porous network of BiVO$_4$ particles, wherein the BiVO$_4$ particles have a mean particle size of less than about 150 nm and the porous network has a surface area of at least about 10 m$^2$/g, as measured by the Brunauer-Emmett-Teller method.

Another embodiment of a photoelectrochemical material comprises a porous network of BiVO$_4$ particles and a coating of oxygen evolution catalyst on the surfaces of the BiVO$_4$ particles. The coating of oxygen evolution catalyst comprises an inner layer of a first oxygen evolution catalyst in direct contact with the surfaces of the BiVO$_4$ particles and an outer layer of a second oxygen evolution catalyst disposed on the inner layer. The first oxygen evolution catalyst is characterized in that it creates fewer interfacial states that can serve as recombination centers at the BiVO$_4$/oxygen evolution catalyst interface than would the second oxygen evolution catalyst and the second oxygen evolution catalyst is characterized in that it has higher catalytic activity for oxygen evolution than does the first oxygen evolution catalyst.

One embodiment of a photoelectrochemical cell comprises: a working photoelectrode comprising a porous network of BiVO$_4$ particles, wherein the BiVO$_4$ particles have a mean particle size of less than about 150 nm and the porous network has a surface area of at least about 10 m$^2$/g, as measured by the Brunauer-Emmett-Teller method; a counter electrode in electrical communication with the working photoelectrode; and an electrolyte solution in which the working photoelectrode and the counter electrode are immersed.

One embodiment of a method for carrying out electrochemical reactions using a photoelectrochemical cell, of the type described above, comprises: exposing the photoelectrode to radiation having energy greater than the bandgap of the BiVO$_4$, such that: the BiVO$_4$ particles absorb the radiation to produce electron-hole pairs; the holes are transported to the electrolyte-photoelectrode interface where they undergo oxidation reactions with the electrolyte; and the electrons are transported to the counter electrode where they undergo reduction reactions with the electrolyte.

One embodiment of a method of making a photoelectrochemical material comprises: applying an organic solution comprising vanadium-containing precursor molecules to the surface of a porous network of plate-like BiOX crystals, where X represents a halogen atom or a mixture of halogen atoms; and heating the applied organic solution and the porous network of plate-like BiOX crystals to convert the porous network of plate-like BiOX crystals into a porous network of BiVO$_4$ particles; wherein the BiVO$_4$ particles have a mean particle size of less than about 150 nm and the porous network of BiVO$_4$ particles has a surface area of at least about 10 m$^2$/g, as measured by the Brunauer-Emmett-Teller method.

Another embodiment of a method of making a photoelectrochemical material comprises: exposing BiVO$_4$ to a reducing atmosphere comprising N$_2$ at an elevated temperature for a time sufficient to create oxygen vacancies and substitutional defects in which oxygen atoms are replaced with nitrogen atoms in the BiVO$_4$.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 3. Effect of OECs on photocurrents for water oxidation and sulfite oxidation. (A) J-V curves of BiVO$_4$ (gray solid line), BiVO$_4$/FeOOH (black dashed), BiVO$_4$/NiOOH (black dot dashed), BiVO$_4$/FeOOH/NiOOH (black solid), and BiVO$_4$/NiOOH/FeOOH (black dot dot dashed) for water oxidation measured in a 0.5 M phosphate buffer (pH 7) under AM 1.5 G illumination. Dark current is shown as a gray dashed line. (B to E) J-V curves of (B) BiVO$_4$/FeOOH, (C) BiVO$_4$/NiOOH, (D) BiVO$_4$/FeOOH/NiOOH, and (E) BiVO$_4$/NiOOH/FeOOH comparing photocurrent for sulfite oxidation (gray dashed) and water oxidation (gray solid) measured with and without the presence of 1.0 M Na$_2$SO$_3$ as hole scavenger. Photocurrent for sulfite oxidation by BiVO$_4$ is shown as the black dashed line for comparison. The mean values and SDs of photocurrent onset potentials and photocurrent densities are summarized in Tables 2 and 3.

FIG. 6. N$_2$ adsorption-desorption measurement and pore size analyses for a nanoporous BiVO$_4$ electrode; (A) BET isotherms and pore size distributions calculated by (B) BJH and (C) MP methods.

DETAILED DESCRIPTION

Figure 1:
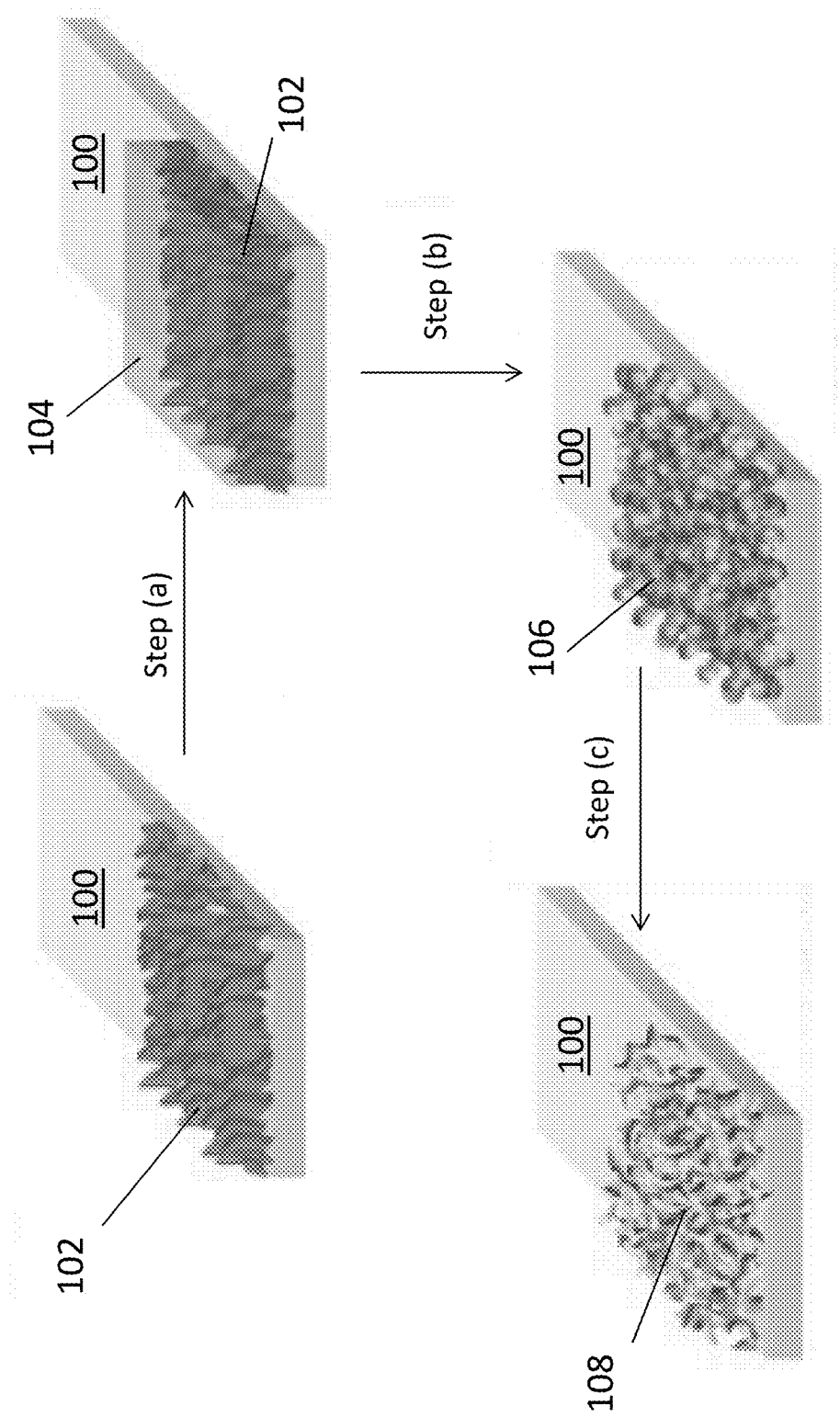
FIG. 1. Schematic representation of the synthesis procedure used in the Example.

Photoelectrochemical materials and photoelectrodes comprising the materials are provided. Also provided are photoelectrochemical cells (PECs) and methods for using the photoelectrochemical cells in water-splitting applications. The photoelectrochemical materials comprise a porous, high-surface-area BiVO$_4$ that is composed of particles having a mean particle size that is comparable to or smaller than the hole diffusion length of BiVO$_4$. As a result, the materials have significantly increased $\varphi_{sep}$, relative to other BiVO$_4$-based photoelectrochemical materials, even in the absence of extrinsic doping. In some embodiments, the BiVO$_4$ is formed with oxygen vacancies and substitutional defects in which oxygen atoms are replaced with nitrogen atoms in order to improve the photoelectrochemical performance of the material.

The photoelectrodes are characterized by high STH efficiencies, including STH efficiencies of 1.5% or greater. In some embodiments, the photoelectrodes provide an STH efficiency of at least 1.7%. This includes embodiments in which the photoelectrodes provide an STH efficiency of at least 2% (e.g., from about 2% to about 3%). Methods for measuring the STH efficiencies of the cells are described in the Example.

In addition, a dual-layer oxygen evolution catalyst (OEC) is provided. The catalyst is provided as a coating on the BiVO$_4$ material and improves the efficiency of water oxidation in a PEC. The two layers that make up the catalyst are designed to optimize the interface between the porous BiVO$_4$ material and the OEC coating, as well as the interface between the OEC coating and the electrolyte of the PEC.

One embodiment of the photoelectrochemical materials comprises a porous network of BiVO$_4$ particles, wherein the BiVO$_4$ particles have a mean particle size of less than about 150 nm and the porous network has a surface area of at least about 10 m$^2$/g. In some embodiments the porous network has a surface area of at least about 25 m$^2$/g. Unless otherwise specified, for the purposes of this disclosure surface area refers to surface area as measured by the Brunauer-Emmett-Teller (BET) method, which is described in the Example. In some embodiments of the materials, the BiVO$_4$ particles have a mean particle size of no greater than about 100 nm. This includes embodiments in which the mean particle size of the BiVO$_4$ particles in the material is no greater than about 85 nm. By way of illustration only, the BiVO$_4$ particles may have a mean particle size in the range from 60 nm to 90 nm.

Particle size can be measured by obtaining representative scanning electron microscope (SEM) images of the materials and measuring the diameter of a collection of the particles in the image. A sufficient number of particle diameters should be measured in order to arrive at an accurate mean particle size for the material. This is illustrated in the Example, which describes the determination of the mean BiVO$_4$ particle size for the material shown in the SEM image of FIG. 2F. The BiVO$_4$ particles may be merged at their interfaces to form shapes having bulbous portions, corresponding to the particles, that are connected by narrower interparticle portions. For these multi-particle forms, the size of the individual particles can be determined by measuring the diameter of the bulbous portions of the shape. Notably, in the present materials, the interfaces at which the particles merge can be free of grain boundaries which tend to decrease carrier mobility.

The nanoporous materials may have an average interparticle pore diameter of less than about 1000 nm. For example, in some embodiments the materials have an average interparticle pore diameter in the range from about 10 to about 500 nm. The average interparticle pore diameter can be determined by using the Barrett-Joyner-Halenda (BJH) formula, as illustrated in the Example. As used herein, the term interparticle pore refers to pores formed in the space between the particles. Interparticle pores are distinguishable from intraparticle pores, which exist within the particles.

The small mean particle size of the BiVO$_4$ particles that make up the materials provides the materials with a high electron-hole separation yield, which renders them well-suited for use as electrode materials in photoelectrochemical cells. A basic embodiment of a PEC comprises: a working photoelectrode comprising a porous network of BiVO$_4$ particles, as described herein; a counter electrode in electrical communication with the working photoelectrode; and an electrolyte solution in which the working photoelectrode and the counter electrode are immersed.

Electron-hole separation yield is the yield of photogenerated holes that reach the surface of the material before undergoing recombination. Because the sizes of the BiVO$_4$ particles are smaller than their hole diffusion lengths, the materials have improved electron-hole separation yield relative to porous BiVO$_4$ materials composed of larger particles. Electron-hole separation yield can be measured for a photoanode comprising the porous materials versus a reversible hydrogen electrode (RHE) using eq. (1):

$$J_{PEC} = J_{abs} \times \varphi_{sep} \times \varphi_{ox} \qquad \text{Eq. (1)}$$

where $J_{PEC}$ is the measured photocurrent density for sulfite oxidation, $J_{abs}$ is i the photon absorption rate expressed as current density and $\varphi_{ox}$ is the yield of surface reaching holes that are injected into solution. (A detailed description of how $\varphi_{sep}$ can be determined using eq. (1) is provided in the Example.) Some embodiments of photoanodes comprising the present photoelectrochemical materials provide a $\varphi_{sep}$ of at least 0.7 at 1.23 V vs. RHE. This includes embodiments that provide a $\varphi_{sep}$ of at least 0.8 and at least 0.9 at 1.23 V vs. RHE. When measured at 0.6 V vs. RHE, these materials can provide a $\varphi_{sep}$ of at least 0.4. This includes embodiments that provide a $\varphi_{sep}$ of at least 0.6 and at least 0.7 at 0.6 V vs. RHE.

The PECs can be used to carry out a variety of electrochemical reactions by exposing the photoelectrode to radiation having energy greater than the bandgap of the $BiVO_4$, such that the $BiVO_4$ particles absorb the radiation to produce photogenerated electron-hole pairs. The photogenerated holes are transported to the electrolyte-photoelectrode interface where they undergo oxidation reactions with an electrolyte and the photogenerated electrons are transported to the counter electrode where they undergo reduction reactions with the electrolyte. For example in a water-splitting reaction, photogenerated holes that reach the electrolyte-photoelectrode interface oxidize water in the aqueous electrolyte solution to form $O_2$, while photogenerated electrons at the counter electrode reduce water in the aqueous electrolyte solution to form $H_2$.

If the PEC is intended for use in water-splitting applications, it may be advantageous to coat the photoelectrode with an OEC. OECs are electrocatalysts for the oxygen evolution reaction at the photoanode and are used to improve the oxidation kinetics. These coatings are typically quite thin and may be continuous or discontinuous. Examples of suitable OECs include oxyhydroxides, hydroxides and oxides of nickel and iron. These compounds can be represented by the formulas $NiO_x(OH)_y$, ($0 \leq x \leq 1.5$, $0 \leq y \leq 3$, where at least one of x and y has a value >0) and $FeO_x(OH)_y$, ($0 \leq x \leq 1.5$, $0 \leq y \leq 3$, where at least one of x and y has a value >0), respectively, and are also referenced as NiOOH and FeOOH. One aspect of the present technology provides a multi-layered OEC coating that includes an inner layer of a first OEC in direct contact with the surface of the $BiVO_4$ particles and an outer layer of a second OEC that is in direct contact with the aqueous electrolyte of a PEC. The first OEC is characterized in that it creates fewer interfacial states within the bandgap of the $BiVO_4$ than would the second OEC. Reducing interfacial states within the bandgap is advantageous because it reduces the recombination pathways for photogenerated holes. The second OEC is characterized in that it has higher catalytic activity for oxygen evolution than does the first OEC. The structure of the materials that make up the first and second OECs should be sufficiently similar that the gains from the reduction in interfacial states at the $BiVO_4$/OEC interface are not lost due to the formation of interfacial states at the $1^{st}$ OEC/$2^{nd}$ OEC interface. The net effect of the dual-layer OEC is that the photoanode coating with the dual-layer OEC has a higher water oxidation efficiency than the same photoanode coated with a single-layer OEC made from either the first or the second OEC alone. In some embodiments of the dual-layer OEC, the inner OEC layer comprises FeOOH and the outer OEC layer comprises NiOOH.

Figures 2A, 2B, 2C, 2D, 2E, 2F:
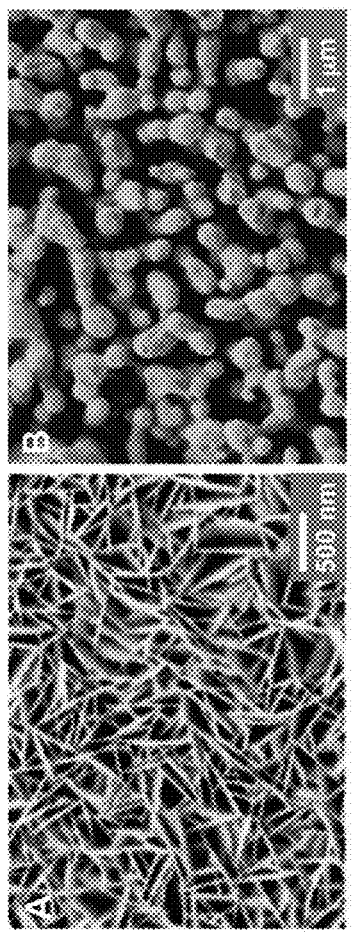
FIG. 2. Morphologies of nanoporous BiVO$_4$ electrodes. (A) SEM image of BiOI. (B and C) Top view and side view SEM images of a BiVO$_4$ electrode prepared using NH$_4$OH/V$_2$O$_5$. (D to F) Top view and side view SEM images of nanoporous BiVO$_4$ prepared using DMSO/VO(acac)$_2$.

The fabrication of the photoelectrochemical materials is illustrated schematically in FIG. 1. As shown in that figure, the materials can be made by applying a non-aqueous organic solution 104 comprising vanadium-containing precursor molecules to the surface of a porous network of plate-like BiOX crystals 102 that are disposed on a substrate 100 (step (a)), where X represents a halogen atom, such as I, Br or Cl, or a mixture of two or more halogen atoms. The applied organic solution and the porous network of plate-like BiOX crystals are then heated to an elevated temperature for a time sufficient to convert the porous network of plate-like BiOX crystals into a porous network of $BiVO_4$ particles with excess $V_2O_5$ 106 (step (b)). The excess $V_2O_5$ can be dissolved using, for example, NaOH to provide a pure, porous network of $BiVO_4$ particles 108 (step (c)). The advantage of using a BiOX, such as BiOI, is that its two dimensional (2D) crystal structure enables electrodeposition of extremely thin plates (~20 nm) with sufficient voids between them (FIG. 2A). These voids inhibit grain growth of $BiVO_4$ during the conversion process, resulting in nanoporous $BiVO_4$ electrodes. By way of illustration only, elevated temperatures include temperatures in the range from about 300 to about 700° C. and sufficient times include times in the range from about 1 to about 6 hours.

One or more organic solvents may be used to make the organic solution. It is desirable to use relatively hydrophobic solvents to achieve good wetting of the BiOX crystal network, which provides a uniform distribution of the vanadium-containing precursor molecules on the surface of the structure. Dimethyl sulfoxide (DMSO) is an example of a suitable organic solvent. Other suitable organic solvents include propylene carbonate, formamide, ethyleneglycol, dimethylformamide, acetonitrile, acetylacetone, diethyl allylmalonate, cinnamyl acetate, benzene, ethanol, acetic acid. The precursor molecules include vanadium oxides, other inorganic vanadium oxides, and metallorganic compounds in which the metal is vanadium. Vanadyl acetylacetonate ($VO(acac)_2$) is one example of a suitable vanadium-containing precursor. Other suitable vanadium-containing precursor molecules include $NH_4VO_3$, VO, $V_2O_3$, $VO_2$, $V_2O_5$, $VCl_2$, $VCl_3$, $V(C_2H_3O_2)_3$, $VOSO_4$.

Once the $BiVO_4$ material has been fabricated in this manner, it may be subjected to a heat treatment in a reducing or an inert atmosphere. This treatment step, which can be conducted at elevated temperatures under a flow of an a reducing or an inert gas, creates oxygen vacancies in the $BiVO_4$. This is advantageous because the vacancies effectively act like dopants to further improve electron-hole separation in the $BiVO_4$. Examples of gases that can be used as reducing or inert gases include $N_2$, $H_2$, CO, $NH_3$, Ar, and mixtures thereof. The use of $N_2$ is advantageous because, in addition to forming oxygen vacancies, nitrogen treatment creates substitutional defects in the $BiVO_4$ in which a portion of the oxygen atoms are replaced by nitrogen atoms. This is advantageous because the nitrogen reduces the bandgap of the $BiVO_4$ so that the material can absorb a broader spectrum of solar radiation, thereby imparting PECs incorporating the electrodes with greater STH efficiencies. For example, the bandgap may be reduced to a value of less than 2.5 eV (e.g., a value in the range from 2.0 to 2.4 eV). By way of illustration, some embodiments of PECs incorporating the treated photoelectrodes provide an STH efficiency of at least 2% (e.g., from about 1.8 to about 3%). This includes embodiments of the PECs that provide as STH efficiency of at least 2.0%. Although the nitrogen treatment is described here in conjunction with the formation of photoelectrochemical materials comprising a porous network of $BiVO_4$ particles, wherein the $BiVO_4$ particles have a mean particle size of less than 150 nm, it can be used to improve the photoelectrochemical performance of other $BiVO_4$-based materials as well.

Once the $BiVO_4$ electrode has been fabricated, a coating comprising one or more OECs can be deposited onto its surface via, for example, photodeposition or electrodeposition from solution, as described in the example that follows.

EXAMPLE

This example illustrates the fabrication of a high-surface-area nanoporous $BiVO_4$ electrode composed of particles having a mean particle size that is smaller than the hole diffusion length of the $BiVO_4$. The results presented here demonstrate that the electrode can effectively increase $\varphi_{sep}$ without additional doping. Furthermore, these studies investigated the effect of an OEC layer on the interfacial recombination at the $BiVO_4$/OEC junction and water oxidation kinetics using two different OECs, FeOOH and NiOOH. The results illustrate the advantage of dual layers of OECs that optimize both the BiVO$_4$/OEC and the OEC/electrolyte junctions simultaneously, to enable efficient utilization of surface-reaching holes for solar water oxidation.

Materials and Methods

Electrodeposition of BiOI Electrodes

A 0.04 M Bi(NO$_3$)$_3$ solution was prepared by dissolving Bi(NO$_3$)$_3$.5H$_2$O in 50 mL of a 0.4 M KI solution after its pH was adjusted to 1.7 by adding HNO$_3$, according to the procedure described in McDonald et al., *Energy Environ. Sci.* 5, 8553-8557 (2012). This solution was mixed with 20 mL of absolute ethanol (100%) containing 0.23 M p-benzoquinone, and was vigorously stirred for a few minutes. A typical three-electrode cell was used for electrodeposition. A fluorine-doped tin oxide (FTO) working electrode (WE), a Ag/AgCl (4 M KCl) reference electrode (RE), and a platinum counter electrode (CE) were used. The platinum CE was prepared by depositing 100 nm platinum on top of a 30 nm titanium adhesion layer on a cleaned glass slide by e-beam evaporation. A VMP2 multichannel potentiostat (Princeton Applied Research) was used for electrodeposition and subsequent electrochemical studies. Cathodic deposition was performed potentiostatically at −0.1 V vs. Ag/AgCl at RT with varying deposition times (1-30 min). The optimum deposition time was found to be 3-5 min, which was equivalent to passing a total charge of 0.13 C/cm$^2$. Under cathodic bias, p-benzoquinone is reduced to hydroquinone, elevating the local pH on the WE (shown below), giving rise to the precipitation of crystalline BiOI on the WE.

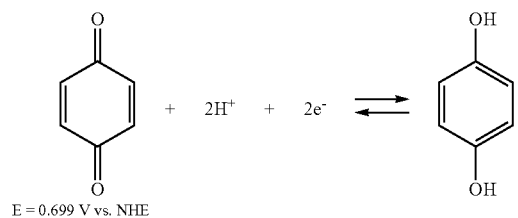

E = 0.699 V vs. NHE

Synthesis of BiVO$_4$ Electrodes 0.15-0.2 mL of a dimethyl sulfoxide (DMSO) solution containing 0.2 M vanadyl acetylacetonate (VO(acac)$_2$) was placed on the BiOI electrode (1 cm×1.3 cm) (FIG. 1) and was heated in a muffle furnace at varying temperatures (350-650° C.) and for varying durations (2-5 h) in air to convert BiOI to BiVO$_4$. BiVO$_4$ electrodes showing the highest photocurrent were obtained when BiOI electrodes were annealed at 450° C. (ramping rate=2° C./min) for 2 h. Excess V$_2$O$_5$ present in the BiVO$_4$ electrodes was removed by soaking them in 1 M NaOH solution for 30 min with gentle stirring. The resulting pure BiVO$_4$ electrodes were rinsed with deionized (DI) water and dried at room temperature (RT).

A non-aqueous dimethyl sulfoxide (DMSO) solution containing vanadyl acetylacetonate, VO(acac)$_2$, as the vanadium source was used. DMSO is relatively hydrophobic. And, in particular, is less hydrophilic that previously used aqueous solutions of V$_2$O$_5$ in NH$_4$OH. This ensured even supply of the vanadium source throughout the BiOI electrode, which induced multiple BiVO$_4$ nucleation processes within a single 2D BiOI sheet, taking apart the sheet and introducing more porosity along the z-axis. The SEM images in FIG. 2 provide a comparison of the morphologies of electrodes made using a solution of V$_2$O$_5$ in NH$_4$OH (FIGS. 2B and 2C) and using the present solution of VO(acac)$_2$ in DMSO (FIGS. 2D and 2F).

Photodeposition of FeOOH/NiOOH OECs on BiVO$_4$ Electrodes (1) Photodeposition of FeOOH on BiVO$_4$.

Photodeposition of FeOOH on the BiVO$_4$ electrode was carried out in a 0.1 M FeSO$_4$ solution while gently stirring. Prior to the photodeposition of FeOOH, the solution was purged with nitrogen gas for 1 h. An undivided three-electrode cell was used, which was composed of a BiVO$_4$ WE, a Pt CE, and a Ag/AgCl (4 M KCl) RE. A 300 W Xe arc lamp with an AM 1.5 G filter, neutral density filters, and a water filter (IR filter) was used as the light source. The light was illuminated through the FTO contact (back-side illumination) and the light intensity at the FTO surface was 1 mW/cm$^2$. During illumination, the holes generated in the valence band of BiVO$_4$ were used to oxidize Fe$^{2+}$ ions to Fe$^{3+}$ ions, which precipitate as FeOOH on the surface of the BiVO$_4$ electrode (Fe$^{2+}$(aq)+h$^+$+3OH$^-$→FeOOH(s)+H$_2$O). (K. J. McDonald, K.-S. Choi, A new electrochemical synthesis route for a BiOI electrode and its conversion to a highly efficient porous BiVO$_4$ photoanode for solar water oxidation *Energy Environ. Sci* 5, 8553-8557 (2012) and J. A. Seabold, K.-S. Choi, Efficient and stable photo-oxidation of water by a bismuth vanadate photoanode coupled with an iron oxyhydroxide oxygen evolution catalyst. *J. Am. Chem. Soc.* 134, 2186-2192 (2012)) To facilitate photodeposition, an external bias of ca. 0.25 V vs. Ag/AgCl (4 M KCl), which was the open circuit potential of the BiVO$_4$ electrode in the solution in dark, was applied. Various deposition times (i.e., 5, 10, 20, 40, and 60 min) were tested and the BiVO$_4$/FeOOH electrode with FeOOH deposited for ~20 min (equivalent to passing a total charge of ~45 mC/cm$^2$) showed the highest photocurrent. After photodeposition, an electrodeposition of FeOOH was carried out in the same solution by applying +1.2 V vs. Ag/AgCl (4 M KCl) for 1 min. This was to deposit FeOOH on any bare BiVO$_4$ or FTO surfaces exposed to the electrolyte.

(2) Photodeposition of NiOOH on BiVO$_4$.

The same procedure used for the photodeposition of FeOOH was used except for the plating solution, which was a 0.1 M NiSO$_4$ solution with pH adjusted to 6.0-7.2 by carefully adding NaOH. During illumination, like the photodeposition of FeOOH, photogenerated holes in BiVO$_4$ oxidized Ni$^{2+}$ to Ni$^{3+}$ ions, and Ni$^{3+}$ ions precipitate as NiOOH (Ni$^{2+}$(aq)+h$^+$+3OH$^-$→NiOOH(s)+H$_2$O). (L. Zhang, Y. Zhong, Z. He, J. Wang, J. Xu, J. Cai, N. Zhang, H. Zhou, H. Fan, H. Shao, J. Zhang, C.-Cao, Surfactant-assisted photochemical deposition of three-dimensional nanoporous nickel oxyhydroxide films and their energy storage and conversion properties. *J. Mater. Chem. A* 1, 4277-4285 (2013).) To facilitate photodeposition, an external bias of ca. 0.11 V vs. Ag/AgCl (4 M KCl), which was the open circuit potential of the BiVO$_4$ electrode in the solution in dark, was applied. The highest photocurrent density of BiVO$_4$/NiOOH was obtained when NiOOH was deposited by passing a total charge of ~22 mC/cm$^2$. After photodeposition, electrodeposition of NiOOH was carried out in the same solution by applying +1.2 V vs. Ag/AgCl (4 M KCl) for 1 min. (G. W. D. Briggs, M. Fleischmann, Anodic deposition of NiOOH from nickel acetate solutions at constant potential. *Trans. Faraday Soc.* 62, 3217-3228 (1966).)

(3) Photodeposition of FeOOH/NiOOH.

In order to prepare BiVO4/FeOOH/NiOOH photoanode, a FeOOH layer was first photodeposited on BiVO$_4$ followed by the photodeposition of NiOOH using the optimum conditions described using the conditions described in (1) and (2). A total charge of ~45 mC/cm² and ~22 mC/cm² was passed for the deposition of FeOOH and NiOOH, respectively. After photodeposition of NiOOH, additional electrodeposition of NiOOH was performed by applying +1.2 V vs. Ag/AgCl (4 M KCl) for 1 min using the same solution. The atomic ratio of Fe/Ni in optimized BiVO₄/FeOOH/NiOOH electrode was estimated to be 2.9±0.7 by EDS analysis. (The standard deviation was obtained by averaging five different electrodes.)

(4) Photodeposition of NiOOH/FeOOH.

For the purpose of comparison with BiVO₄/FeOOH/NiOOH, BiVO₄/NiOOH/FeOOH with a reversed OEC junction was also prepared by first photodepositing NiOOH on BiVO₄ followed by the photodeposition of FeOOH using the conditions described in (1) and (2). A total charge of ~22 mC/cm² and ~45 mC/cm² was passed for the deposition of NiOOH and FeOOH, respectively. After photodeposition of FeOOH, additional electrodeposition of FeOOH was performed by applying +1.2 V vs. Ag/AgCl (4 M KCl) for 1 min using the same solution. The atomic ratio of Fe/Ni for the reverse BiVO₄/NiOOH/FeOOH electrode prepared was comparable 5 to that of the BiVO₄/FeOOH/NiOOH.

Nitrogen Treatment

The nitrogen treatment of the BiVO₄ electrode was performed by heating the electrode in a tube furnace while flowing N₂. The tube furnace was purged by flowing N₂ at 25° C. for 1 h and then the temperature was raised and kept at 350° C. for 1 h (ramping rate. 6° C./min).

therms at liquid nitrogen temperature (77 K) using a surface area analyzer (Micromeritics Gemini VII 2390). The sample was degassed at 200° C. for 12 h under vacuum prior to the adsorption measurements. The result shows that the nanoporous BiVO₄ displays the Brunauer-Deming-Deming-Teller (BDDT) type I and type IV shape isotherms, along with H2 and/or H3-type hysteresis loop (at $0.4<pp_o^{-1}<1$) in IUPAC classification, suggesting the presence of mesopores and macropores. (T. Allen, *Particle Size Measurement* (Chapman and Hall, London, 1997).) The sample also exhibits steep N₂ adsorption at $pp_o^{-1}<0.05$, indicating the presence of high concentration of micropores. The mesopores and macropores represent voids present between BiVO₄ nanoparticles while the micropores represent pores present within each BiVO₄ particle. The specific surface area of nanoporous BiVO₄ electrode was estimated to be 31.8±2.3 m²/g based on a fitting analysis using the Brunauer-Emmett-Teller (BET) equation (Table 1). The zeta potential of BiVO₄, BiVO₄/FeOOH, and BiVO₄/NiOOH were measured using a zeta potential analyzer (Micromeritics NanoPlus-2) after dispersing nanoparticles scratched from each electrode in 0.5 M phosphate buffer solution (pH 7). To compensate for the loss of the OEC layer and the reduction of the OEC coverage on the BiVO₄ surface during sample preparation (e.g., sonication) a thicker layer of OEC was deposited for this measurement.

That the photoelectrochemical performances of the electrodes for sulfite oxidation and water oxidation are summarized in Tables 2 and 3, which are discussed in more detail in the Results.

TABLE 1

| Sample | Specific surface area (m² g⁻¹) | | $S_{micro}$ | $V_{total}$ (mL g⁻¹) | $V_{micro}$ (mL g⁻¹) | $V_{meso}$ (mL g⁻¹) | Slit Width (Å) | Pore size (nm) |
|---|---|---|---|---|---|---|---|---|
| | $S_{BET}$ | $S_{Langmuir}$ | | | | | | |
| Nanoporous BiVO₄ | 31.8 ± 2.3 (0.9978)* | 42.5 ± 2.7 (0.9998) | 13.3 | 0.051 | 0.011 | 0.041 | 8.9 | 20~250 |

*The values in parentheses denote correlation factors.
Parameters of the nanoporous BiVO₄ obtained from N₂ adsorption-desorption measurement; $S_{BET}$ = specific surface area calculated from BET equation, $S_{Langmuir}$ = specific surface area calculated from Langmuir equation, $V_{total}$ = total pore volume (taken from the volume of N₂ adsorbed at about P/P₀ = 0.990), $V_{micro}$ = micropore volume (estimated by the t-plot), slit width estimated by the micropore analysis (MP) method, and the average pore diameter estimated from the Barrett Joyner-Halenda (BJH) formula.

Characterization

The purity and crystal structure of BiOI and BiVO₄ electrodes were examined by powder X-ray diffraction (Bruker D8 Advanced PXRD, λ, =1.5418 Å, 298 K, Ni-filtered Cu Kα-radiation). The crystal morphologies of the electrodes were examined with Scanning Electron Microscopy (SEM) using a LEO 1530 or a Hitachi S3400-N microscope at an accelerating voltage of 5-15 kV. The Bi/V ratio of the BiVO₄ electrode was confirmed to be 1.02±0.05 by optical emission spectrometry-inductively coupled plasma spectrometry (OES-ICP) (Perkin Elmer Optima 2000) and a Hitachi S3400-N microscope equipped with an energy dispersive X-ray spectrometer (EDS) (Thermo Fisher Scientific Inc.), indicating the absence of any Bi or V containing amorphous impurities that cannot be detected by XRD. UV-vis absorption spectra were obtained on a Cary 5000 UV-vis spectrophotometer, in which the sample electrode was placed in the center of an integrating sphere to measure all light reflected and transmitted to accurately assess the absorbance. FTO glass was used as the reference for these absorption measurements. The surface area and pore structure of the present bare-BiVO₄ electrode were examined by measuring nitrogen adsorption-desorption iso- Photoelectrochemical Measurements Photoelectrochemical performances of photoanodes were evaluated in a typical undivided three-electrode configuration using a SP-200 potentiostat/EIS (BioLogic Science Instrument). The simulated solar illumination was obtained by passing light from a 300 W Xe arc lamp through a water filter (IR filter)/neutral density filters/an AM 1.5 G filter. Illumination through the FTO side (back-side illumination) was used. The power density of the incident light was calibrated to 100 mW/cm² at the surface of the FTO substrate (before the light penetrates FTO) by using a thermopile detector (International Light) and a NREL certified reference cell (Photo Emission Tech., Inc.). All illuminated areas were 0.2 cm². Photocurrent measurements were performed in a 0.5 M potassium phosphate (KH₂PO₄) buffer solution (pH 7) with or without 1 M sodium sulfite (Na₂SO₃) as a hole scavenger. Prior to measurements, the electrolyte was thoroughly deaerated by purging it with nitrogen for 1 h. Photocurrents were monitored either while sweeping the potential to the positive direction with a scan rate of 10 mV/s or while applying a constant bias. Photocurrents were also obtained with chopped illumination to examine 7 transient photocurrents. While all measurements were carried out using a Ag/AgCl (4M KCl) reference electrode, all results in this work were presented against the reversible hydrogen electrode (RHE) for ease of comparison with $H_2$ and $O_2$ redox levels and other reports that used electrolytes with different pH conditions. The conversion between potentials vs. Ag/AgCl and vs. RHE is performed using the equation below.

E (vs. RHE)=E (vs. Ag/AgCl)+$E_{Ag/AgCl}$ (reference)+ 0.0591 V×pH ($E_{Ag/AgCl}$ (reference)=0.1976 V vs. NHE at 25° C.).

Incident photon-to-current efficiency (IPCE) at each wavelength was determined using illumination from a 300 W Xe arc lamp passed through an AM 1.5 G filter and neutral density filters to approximate the output of the sun. Monochromatic light was produced using an Oriel Cornerstone 130 monochromator with a 10-nm bandpass, and the output was measured with a photodiode detector. IPCE was measured at 0.6 V vs. RHE in 0.5 M phosphate buffer (pH 7) using the same three-electrode setup described above for photocurrent measurements. Absorbed photon-to-current efficiency (APCE) was obtained by dividing the IPCE by the light harvesting efficiency (LHE) at each wavelength using the following equations.

APCE (%)=IPCE (%)/LHE

LHE=$1-10^{-A(\lambda)}$ (A($\lambda$): absorbance at wavelength $\lambda$)

In order to calculate $J_{max}$ (maximum photocurrent density achievable assuming 100% IPCE for photons with energy $\geq E_g$) of $BiVO_4$ with a bandgap energy of 2.5 eV, the National Renewable Energy Laboratory (NREL) reference solar spectral irradiance at AM 1.5 G (radiation energy (W·m$^{-2}$·nm$^{-1}$) vs. wavelength (nm)) (ASTM Standard G173-03, 2008, "Standard Tables for Reference Solar Spectral Irradiances: Direct Normal and Hemispherical on 37° Tilted Surface," ASTM International, West Conshohocken, Pa., 2003, DOI: 10.1520/G0173-03R08) was first converted to the solar energy spectrum in terms of number of photons (s$^{-1}$·m$^{-2}$·nm$^{-1}$) vs. wavelength (nm). Then, the number of photons above the bandgap energy of the bare-$BiVO_4$ shown in this study (bandgap=2.5 eV) was calculated using a trapezoidal integration (in 10 nm increments) of the spectrum and was converted to the current density (mA·cm$^{-2}$). In order to calculate $J_{abs}$ (photocurrent assuming 100% APCE), the LHE at each wavelength was multiplied during each step of the trapezoidal integration. Using these calculations, $J_{max}$=6.47 mA/cm$^2$ and $J_{abs}$=4.45 mA/cm$^2$ were obtained.

The STH efficiency was calculated using a J-V curve obtained from a two electrode system assuming 100% Faradaic efficiency using the following equation, where J is the photocurrent density, $V_{bias}$ is the applied bias between WE and CE, and $P_{in}$ is the incident illumination power density (AM 1.5G, 100 mW/cm$^2$). (See M. G. Walter, E. L. Warren, J. R. McKone, S. W. Boettcher, Q. Mi, E. A. Santori, N. S. Lewis, Solar Water Splitting Cells. *Chem. Rev.* 110, 6446-6473 (2010).)

$$STH\ Efficiency\ (\%) = \left[\frac{J\left(\frac{mA}{cm^2}\right) \times (1.23 - V_{bias})(V)}{P_{in}\left(\frac{mW}{cm^2}\right)}\right]_{AM\ 1.5G} \times 100$$

Capacitances were measured to obtain Mott-Schottky plots for the $BiVO_4$ based electrodes using a SP-200 potentiostat/EIS (BioLogic Science Instrument). A sinusoidal modulation of 10 mV was applied at frequencies of 0.5 and 1 kHz. The three-electrode setup was used with a 0.5 M phosphate buffer (pH 7). All electrodes were masked with epoxy resin to expose the same geometrical area (0.2 cm$^2$) for this measurement.

$O_2$ measurements were conducted using an Ocean Optics fluorescence-based oxygen sensor (FOSPOR-R 1/16"). The probe measures the $O_2$ content in the headspace as mole %, which was converted to micromoles after adjusting for the $O_2$ dissolved in solution using Henry's Law. Two different cell configurations were tested for $O_2$ measurements. One was a custom built, airtight, two-compartment cell divided by a frit with one chamber containing a $BiVO_4$/FeOOH/ NiOOH WE along with a Ag/AgCl RE and the other containing a Pt coil CE (three-electrode setup). For this cell, $O_2$ measurements were made while applying 0.6 V between the WE and the CE. The amount of $O_2$ detected was divided by the amount of $O_2$ expected calculated from photocurrent assuming 100% Faradaic efficiency (F.E.) to calculate the true Faradaic efficiency or the photocurrent-to-$O_2$ conversion efficiency. Measurements obtained from the two different configurations gave comparable results (F.E.>90%). $H_2$ measurements were carried out by applying 0.6 V between the WE and the CE (two-electrode system) in an airtight undivided cell, using gas chromatography (GC) (SRI Instruments) to analyze the headspace. The amount of $H_2$ gas evolved was determined by taking 100 μL of gas from the headspace of the cell using a syringe and injecting it into the gas-sampling loop of the GC every three hours. The GC was equipped with a packed MolSieve 13X column. Helium (Airgas, ultra high purity) was used as the carrier gas. A helium ionization detector (HID) was used to quantify hydrogen concentration.

Additional information regarding the materials, methods and characterization of the electrodes can be found in Choi et al., Nanoporous $BiVO_4$ Photoanode with Dual-Layer Oxygen Evolution Catalyst for Solar Water Splitting, *Science* 343, 990-994 (2014), including the accompanying Supplementary Material available at www.sciencemag.org/ content/science.1246913/DCI, the entire contents of which are incorporated herein by reference.

Results

Figure 5:
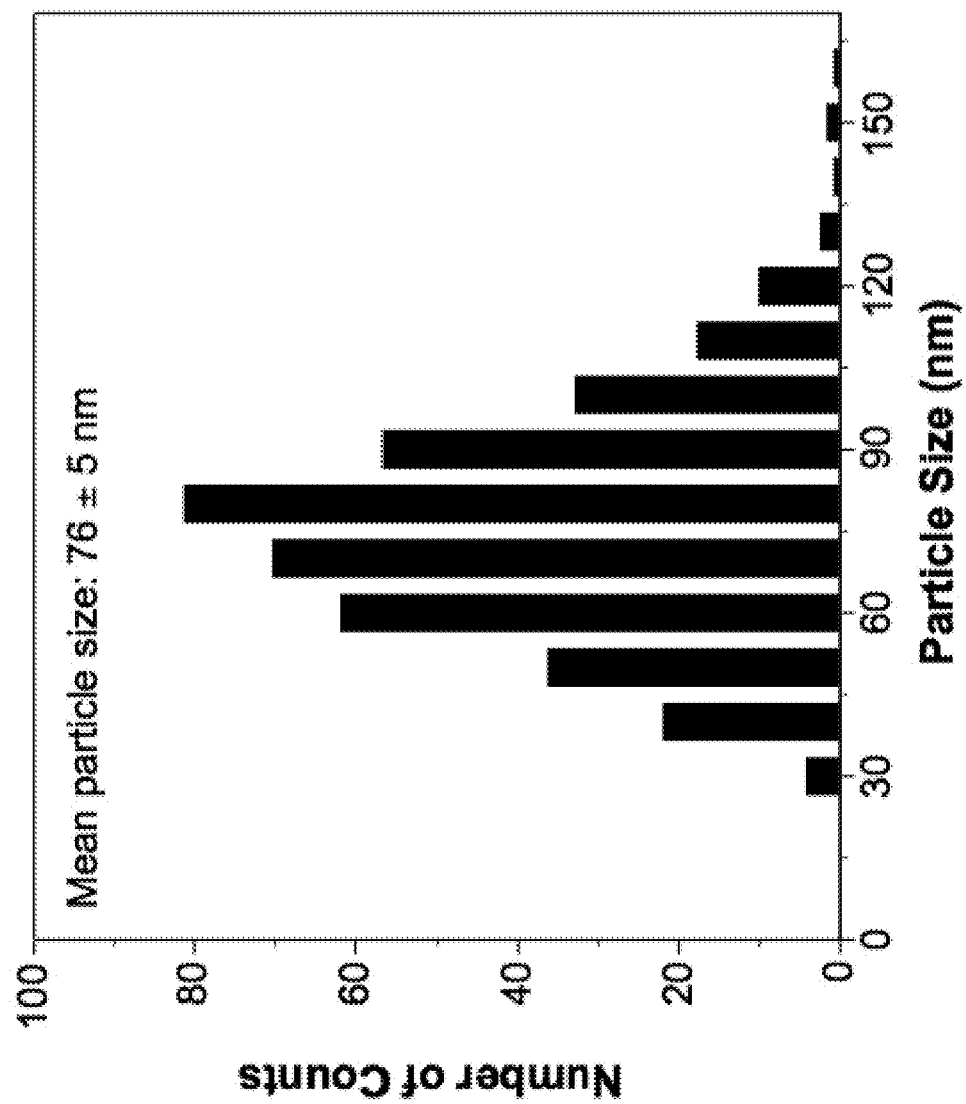
FIG. 5. Particle size distribution of BiVO$_4$ in the nanoporous BiVO$_4$ electrode obtained from measuring diameters of 400 particles shown in SEM images.

The use of comparatively hydrophobic VO(acac)$_2$/DMSO solution overcame this problem and resulted in a remarkable increase in surface area. The top view and side-view scanning electron microscopy (SEM) images show the formation of much smaller $BiVO_4$ nanoparticles (mean particle size=76±5 nm) (FIG. 5) creating a 3D nanoporous network (FIG. 2, D to F).

$N_2$ adsorption-desorption-isotherm measurements show that the nanoporous $BiVO_4$ electrode contains micropores within $BiVO_4$ particles as well as mesopores and macropores between $BiVO_4$ nanoparticles (FIG. 6 and Table 1). The specific surface area of the nanoporous $BiVO_4$ electrode was estimated to be 31.8±2.3 m$^2$/g based on a fitting analysis using the Brunauer-Emmett-Teller equation. (T. Allen, *Particle Size Measurement* (Chapman and Hall, London, 1997).) $BiVO_4$ electrodes prepared by using other synthesis methods (such as metal organic decomposition, spray deposition, or direct electrodeposition of $BiVO_4$) possess more limited surface areas.

The purity and crystal structure of the nanoporous $BiVO_4$ electrode (monoclinic scheelite structure) were confirmed with x-ray diffraction. The bandgap of the nanoporous $BiVO_4$ electrode was estimated to be ~2.50 to 2.55 eV, using ultraviolet-visible absorption spectra.

Figures 7A, 7B:
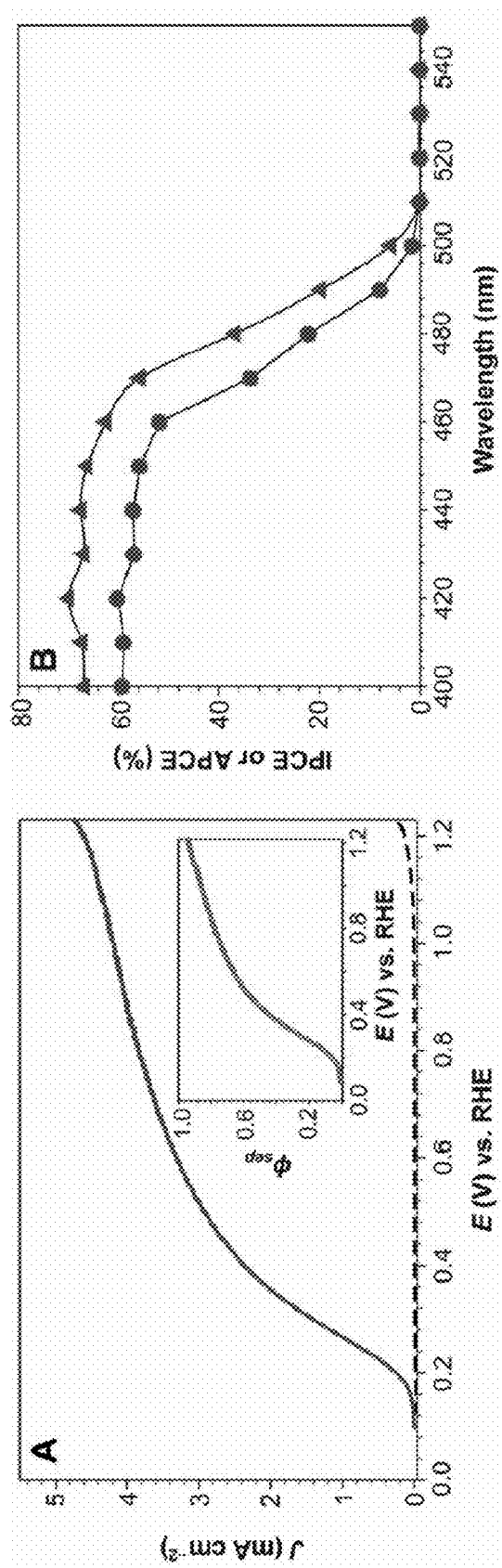
FIG. 7. Photoelectrochemical properties of a nanoporous BiVO$_4$ electrode for sulfite oxidation. (A) J-V curve of the nanoporous BiVO$_4$ electrode measured in a 0.5 M phosphate buffer (pH 7) containing 1 M Na$_2$SO$_3$ as a hole scavenger under AM 1.5 G, 100 mW/cm$^2$ illumination (scan rate, 10 mV/s). Dark current is shown as a dashed line. (Inset) $\varphi_{sep}$ calculated from the J-V curve after dark current is subtracted. (B) IPCE (circles) and APCE (triangles) measured in the same solution at 0.6 V versus RHE.

The photoelectrochemical properties were first examined in the presence of 1 M sodium sulfite ($Na_2SO_3$), which served as the hole scavenger. The oxidation of sulfite is thermodynamically and kinetically more facile than oxidation of water, and therefore, measuring photocurrent for sulfite oxidation enables investigation of the photoelectrochemical properties of $BiVO_4$ independently of its poor water oxidation kinetics. A typical photocurrent-potential (J-V) curve of the sulfite oxidation with nanoporous $BiVO_4$ is shown in FIG. 7A. A very early photocurrent onset potential, 0.1 V versus reversible hydrogen electrode (RHE), and a rapid increase in photocurrent in the 0.2 V<E versus RHE<0.6 V region, representing an excellent fill factor, resulted in a photocurrent density of 3.3±0.3 mA/cm² at a potential as low as 0.6 V versus RHE. The incident photon-to-current conversion efficiency (IPCE) and the absorbed photon-to-current conversion efficiency (APCE) of the nanoporous $BiVO_4$ at 0.6 V versus RHE are 60 and 72%, respectively, at 420 nm (FIG. 7B).

Photocurrent density obtained for sulfite oxidation was used to calculate $\varphi_{sep}$ by using Eq. 1, where $J_{PEC}$ is the measured photocurrent density and $J_{abs}$ is the photon absorption rate expressed as current density, which is calculated assuming 100% APCE, as described previously. $J_{abs}$ of the nanoporous $BiVO_4$ electrode was calculated to be 4.45 mA/cm². $\varphi_{sep}$ is the yield of the photogenerated holes that reach the surface, and $\varphi_{ox}$ is the yield of the surface reaching holes that are injected into the solution species. (M. Zhou et al., Chem Sus Chem 5, 1420-1425 (2012).)

$$J_{PEC} = J_{abs} \times \varphi_{sep} \times \varphi_{ox} \qquad \text{Eq. (1)}$$

For sulfite oxidation with extremely fast oxidation kinetics, surface recombination is negligible, and $\varphi_{ox}$ is ~1. Therefore, $\varphi_{sep}$ is obtained by dividing $J_{PEC}$ by $J_{abs}$ (FIG. 7A, inset). The result shows that the nanoporous $BiVO_4$ electrode achieves $\varphi_{sep}$=0.70±0.03 and 0.90±0.03 at 0.6 V and 1.23 V versus RHE, respectively. The hole diffusion length of $BiVO_4$ was recently reported to be ~100 nm when using single-crystal $BiVO_4$. (A. J. E. Rettie et al., J. Am. Chem. Soc. 135, 11389-11396 (2013).) The mean particle size of $BiVO_4$ composing the nanoporous $BiVO_4$ electrode shown in FIG. 2D is 76±5 nm (FIG. 5), and the particle size obtained from the XRD peaks when using the Scherrer equation is 27±2 nm. Therefore, the nanoporosity incorporated into $BiVO_4$ electrodes in this study appears to be ideal for effectively suppressing bulk carrier recombination, resulting in a record high $\varphi_{sep}$.

Photocurrent from the nanoporous $BiVO_4$ for water oxidation shown in FIG. 3A (black line) is considerably lower than the photocurrent for sulfite oxidation (FIG. 7A), indicating that the majority of the surface-reaching holes were lost to surface recombination because of the poor catalytic nature of the $BiVO_4$ surface for water oxidation. (Y. Park, K. J. McDonald, K.-S. Choi, Chem. Soc. Rev. 42, 2321-2337 (2013).) To improve water oxidation kinetics, a thin FeOOH or NiOOH layer was photodeposited on the nanoporous $BiVO_4$ surface as an OEC layer in order to assemble $BiVO_4$/FeOOH and $BiVO_4$/NiOOH electrodes. Their thicknesses were optimized so as to maximize photocurrent generation. It has been previously demonstrated that FeOOH interfaces well with $BiVO_4$ (K. J. McDonald, K.-S. Choi, Energy Environ. Sci 5, 8553-8557 (2012) and J. A. Seabold, K.-S. Choi, J. Am. Chem. Soc. 134, 2186-2192 (2012)), whereas NiOOH is known to be a more active OEC than FeOOH (less overpotential required to achieve the same current density) as a dark electrocatalyst on a conducting substrate. (L. Trotochaud, J. K. Ranney, K. N. Williams, S. W. Boettcher, J. Am. Chem. Soc. 134, 17253-17261 (2012); R. D. L. Smith et al., Science 340, 60-63 (2013); and M. W. Louie, A. T. Bell, J. Am. Chem. Soc. 135, 12329-12337 (2013).)

The photocurrents for water oxidation from the resulting $BiVO_4$/FeOOH and $BiVO_4$/NiOOH photoanodes were markedly higher than those from the bare $BiVO_4$ electrode (FIG. 3A and Table 3), but their photocurrents were still lower than that generated for sulfite oxidation at the bare $BiVO_4$ electrode. This comparison suggested that neither $BiVO_4$/FeOOH nor $BiVO_4$/NiOOH engages all surface-reaching holes in the oxygen evolution reaction, instead losing a portion to surface recombination at the $BiVO_4$/OEC junction. The interface states formed at the $BiVO_4$/OEC junction can serve as recombination centers and cause surface recombination. The fact that $BiVO_4$/FeOOH generated higher photocurrent than did $BiVO_4$/NiOOH, although NiOOH shows faster water oxidation kinetics as an electrocatalyst, suggests that the interface recombination at the $BiVO_4$/NiOOH junction is more substantial than that at the $BiVO_4$/FeOOH junction. This can be easily confirmed by comparing photocurrents for sulfite oxidation by $BiVO_4$, $BiVO_4$/FeOOH, and $BiVO_4$/NiOOH (FIG. 3, B and C, and Table 3). Because the interfacial hole transfer rates for sulfite oxidation on the $BiVO_4$, FeOOH, and NiOOH surfaces should be equally fast, any difference observed in photocurrents for sulfite oxidation by $BiVO_4$, $BiVO_4$/FeOOH, and $BiVO_4$/NiOOH should be mainly due to the recombination at the BiVO4/OEC junction. The comparison shows that photocurrent for $BiVO_4$/FeOOH is very close to that for $BiVO_4$, whereas the photocurrent for $BiVO_4$/NiOOH is considerably lower, which indicates that the interface recombination at the $BiVO_4$/NiOOH junction is indeed more substantial.

In addition to the interface recombination at the $BiVO_4$/OEC junction, slow water oxidation kinetics at the OEC/solution junction can cause additional surface recombination during water oxidation. (C. Y. Cummings, F. Marken, L. M. Peter, A. A. Tahir, K. G. Wijayantha, Chem. Commun. (Camb.) 48, 2027-2029 (2012); and L. M. Peter, K. G. Wijayantha, A. A. Tahir, Faraday Discuss. 155, 309-322, discussion 349-356 (2012).) This additional surface recombination can be shown as the difference in photocurrent for sulfite oxidation and water oxidation (FIG. 3, B and C). When the rate of interfacial hole transfer for water oxidation is slower than the rate of holes entering the OEC layer, holes are accumulated in the OEC layer and at the $BiVO_4$/OEC junction, which in turn increases the electron current from the CB of $BiVO_4$ to the OEC layer for surface recombination. (L. M. Peter, K. G. Wijayantha, A. A. Tahir, Faraday Discuss. 155, 309-322, discussion 349-356 (2012).) Because FeOOH has slower water oxidation kinetics than that of NiOOH, the difference in photocurrent for water oxidation and sulfite oxidation is more pronounced for $BiVO_4$/FeOOH than $BiVO_4$/NiOOH (FIG. 3, B and C). However, when the effects of interface recombination at the $BiVO_4$/OEC junction and water oxidation kinetics are combined, $BiVO_4$/NiOOH loses more surface-reaching holes to surface recombination and generates lower photocurrent than does $BiVO_4$/FeOOH for water oxidation (FIG. 3A).

On the basis of this new understanding of the $BiVO_4$/OEC and the OEC/electrolyte interfaces, consecutive layers of FeOOH and NiOOH were deposited, simultaneously optimizing the $BiVO_4$/OEC and the OEC/electrolyte junctions. The FeOOH at the $BiVO_4$/OEC junction will reduce the interface recombination, whereas the NiOOH at the OEC/ electrolyte junction will realize faster water oxidation kinetics than if FeOOH was used as the outermost layer.

The $BiVO_4$/FeOOH/NiOOH and $BiVO_4$/FeOOH show comparable J-V curves for sulfite oxidation, confirming that the $BiVO_4$/FeOOH junction effectively reduces the interface recombination at the $BiVO_4$/OEC junction (FIG. 3, B and D). As a result, $BiVO_4$/FeOOH/NiOOH shows impressive overall performance for water oxidation, reaching a photocurrent density of 2.8±0.2 mA/cm$^2$ at 0.6 V versus RHE (FIG. 3A and Table 2), which is markedly better than those of $BiVO_4$/FeOOH and $BiVO_4$/NiOOH and is almost comparable with the performance of bare $BiVO_4$ for sulfite oxidation.

When NiOOH was first deposited on the $BiVO_4$ surface and FeOOH was added as the outermost layer to form $BiVO_4$/NiOOH/FeOOH (reversed OEC junction), the J-V curve for sulfite oxidation by $BiVO_4$/NiOOH/FeOOH was comparable with that by $BiVO_4$/NiOOH, confirming that a $BiVO_4$/NiOOH junction is not favorable for interface recombination (FIG. 3, C and E). As a result, $BiVO_4$/NiOOH/FeOOH showed the lowest photocurrent for water oxidation. These results demonstrate that the photocurrent enhancement achieved by the $BiVO_4$/FeOOH/NiOOH photoanode for photoelectrolysis of water is truly due to the simultaneous optimization of the $BiVO_4$/OEC and OEC/electrolyte junctions, using an optimum dual OEC structure.

TABLE 2

Average photocurrent onset potential and photocurrent densities at 0.6 and 1.23 V vs. RHE obtained from J-V measurements for water oxidation for $BiVO_4$, $BiVO_4$/FeOOH, $BiVO_4$/NiOOH, $BiVO_4$/FeOOH/NiOOH, and $BiVO_4$/NiOOH/FeOOH in a 0.5M phosphate buffer (pH 7) solution (AM 1.5G, 100 mW/cm$^2$). For each system five measurements using five different samples were used for analysis.

|  | $BiVO_4$ | $BiVO_4$/FeOOH | $BiVO_4$/NiOOH | $BiVO_4$/FeOOH/NiOOH | $BiVO_4$/NiOOH/FeOOH |
|---|---|---|---|---|---|
| Photocurrent onset potential (V vs. RHE) | 0.43 (±0.04) | 0.31 (±0.03) | 0.26 (±0.04) | 0.23 (±0.03) | 0.31 (±0.02) |
| J at 0.6 V vs. RHE (mA/cm$^2$) | 0.4 (±0.2) | 2.2 (±0.2) | 1.8 (±0.2) | 2.8 (±0.2) | 1.6 (±0.2) |
| J at 1.23 V vs. RHE (mA/cm$^2$) | 1.8 (±0.3) | 3.6 (±0.2) | 3.3 (±0.3) | 4.2 (±0.3) | 3.2 (±0.4) |

TABLE 3

Average photocurrent onset potential and photocurrent density at 0.6 V vs. RHE obtained from J-V measurements for sulfite oxidation for $BiVO_4$, $BiVO_4$/FeOOH, $BiVO_4$/NiOOH, $BiVO_4$/FeOOH/NiOOH, and $BiVO_4$/NiOOH/FeOOH in a 0.5M phosphate buffer (pH 7) solution containing 1M $Na_2SO_3$ (AM 1.5G, 100 mW/cm$^2$). For each system five measurements using five different samples were used for analysis.

|  | $BiVO_4$ | $BiVO_4$/FeOOH | $BiVO_4$/NiOOH | $BiVO_4$/FeOOH/NiOOH | $BiVO_4$/NiOOH/FeOOH |
|---|---|---|---|---|---|
| Photocurrent onset potential (V vs. RHE) | 0.11 (±0.02) | 0.18 (±0.02) | 0.12 (±0.02) | 0.13 (±0.02) | 0.19 (±0.02) |
| J at 0.6 V vs. RHE (mA/cm$^2$) | 3.3 (±0.3) | 3.1 (±0.2) | 2.4 (±0.2) | 3.1 (±0.2) | 2.4 (±0.3) |

Figure 4A:
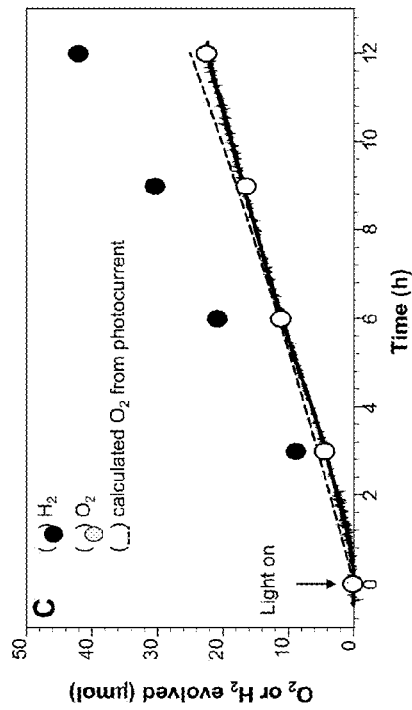
FIG. 4. Photoelectrolysis of water by BiVO$_4$/FeOOH/NiOOH photoanode. (A) STH obtained using a two-electrode system. (B) J-t curve measured at 0.6 V versus counter electrode in a phosphate buffer (pH 7) under AM 1.5 G illumination. (C) Detection of H$_2$ and O$_2$ at 0.6 V versus counter electrode.
Figure 4B:
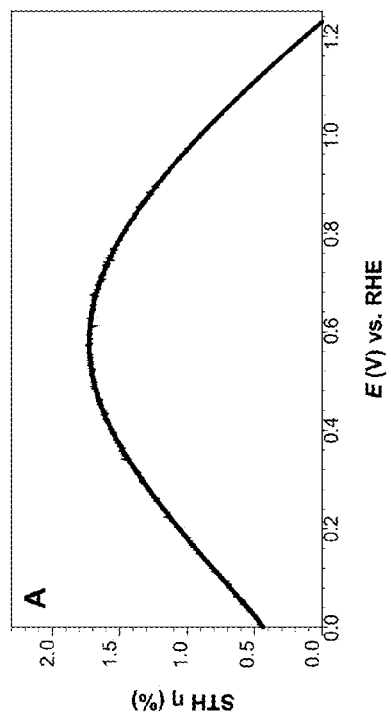
Figure 4C:
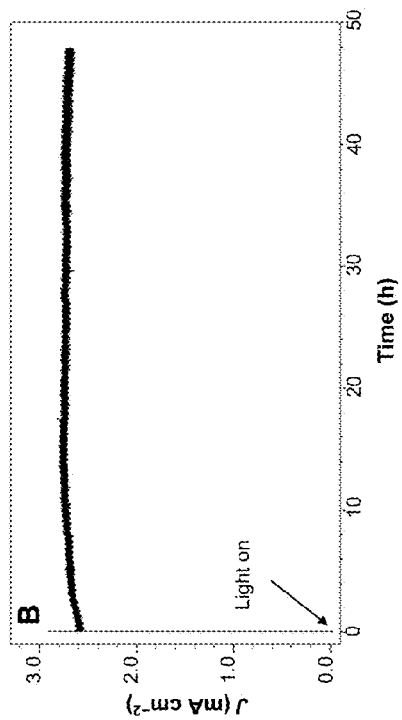

The STH efficiency of the $BiVO_4$/FeOOH/NiOOH electrode calculated by using its J-V curve obtained by using a two-electrode system (working electrode and a Pt counter electrode), assuming 100% Faradaic efficiency, is plotted in FIG. 4A. (M. G. Walter et al., Chem. Rev. 110, 6446-6473 (2010).)) The maximum STH efficiency of 1.72% achieved by the system is impressive because it is obtained by using unmodified $BiVO_4$ as a single photon absorber. Moreover, this efficiency is achieved at a potential as low as 0.58 V versus RHE, which is a highly favorable feature for assembling a tandem cell or a photoelectrochemical diode. (F. F. Abdi et al., Nat. Commun. 4, 2195 (2013), M. G. Walter et al., Chem. Rev. 110, 6446-6473 (2010) and L. Tong et al., Energy Environ. Sci. 5, 9472-9475 (2012).) The long term stability of $BiVO_4$/FeOOH/NiOOH was tested by obtaining a J-t curve. A photocurrent density of 2.73 mA/cm$^2$, obtained by applying 0.6 V between the working and counter electrodes, was maintained for 48 hours without showing any sign of decay, proving its long-term stability (FIG. 4B). The $O_2$ measurement made by using a fluorescence $O_2$ sensor confirmed that the photocurrent generated at 0.6 V versus counter electrode was mainly associated with $O_2$ production (>90% photocurrent-to-$O_2$ conversion efficiency) (FIG. 4C). The same results were obtained when the measurement was performed at 0.6 V versus RHE. $H_2$ production at the Pt counter electrode was also detected with gas chromatography (GC) (FIG. 4C). The molar ratio of the produced $H_2$:$O_2$ was 1.85:1. The slight deviation from the stoichiometric ratio of 2:1 is due to our imperfect manual sampling method of $H_2$ for GC analysis.

Because this outstanding performance was achieved by using simple, unmodified $BiVO_4$ (no extrinsic doping and no composition tuning) as the only photon absorber, further improvement of the cell efficiency can be achieved by tuning compositions or forming heterojunctions and tandem cells are used to enhance photon absorption and electron-hole separation.

Unless otherwise specified, all temperature- and/or pressure-dependent values cited herein are the values at the temperature and pressure at which the electrodes or PECs are being operated. For example, the an electrode or PEC may be operated at room temperature (~23° C.) and atmospheric pressure.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An electrode comprising a porous network of connected $BiVO_4$ particles, including $BiVO_4$ particles that are merged at their interfaces, wherein the porous network has a surface area of at least about 20 m$^2$/g, as measured by the Brunauer-Emmett-Teller method, and further wherein the electrode is characterized in that it generates a photocurrent density of at least 0.2 mA/cm$^2$ at 1 V versus reversible hydrogen electrode for water oxidation under 100 mW/cm$^2$, AM 1.5 G illumination.

2. The electrode of claim 1 having an electron-hole separation yield of at least 0.8 at 1.23 V versus a reversible hydrogen electrode.

3. The electrode of claim 1, further comprising a coating of oxygen evolution catalyst on the surfaces of the BiVO$_4$ particles.

4. The electrode of claim 3, wherein the oxygen evolution catalyst comprises NiO$_x$(OH)$_y$ (0≤x≤1.5, 0≤y≤3, where at least one of x and y has a value >0) or FeO$_x$(OH)$_y$ (0≤x≤1.5, 0≤y≤3, where at least one of x and y has a value >0), or a combination thereof.

5. The electrode of claim 1, wherein the BiVO$_4$ comprises vacancies at a portion of the oxygen atom sites and further wherein a portion of the oxygen atoms in the BiVO$_4$ are substituted with nitrogen atoms.

6. The electrode of claim 5, wherein the nitrogen atoms reduce the bandgap of the BiVO$_4$ relative to the BiVO$_4$ without the nitrogen atoms.

7. The electrode of claim 1, wherein the porous network has a surface area of at least about 25 m$^2$/g, as measured by the Brunauer-Emmett-Teller method.

8. The electrode of claim 1, wherein the BiVO$_4$ particles have a mean particle size of less than about 100 nm.

9. The electrode of claim 1, wherein the BiVO$_4$ particles have a mean particle size of less than about 150 nm.

10. An electrode comprising: a porous network of connected BiVO$_4$ particles, including BiVO$_4$ particles that are merged at their interfaces, wherein the porous network has a surface area of at least about 10 m$^2$/g, as measured by the Brunauer-Emmett-Teller method; and a coating of oxygen evolution catalyst on the surfaces of the BiVO$^4$ particles, wherein the coating of oxygen evolution catalyst comprises an inner layer of a first oxygen evolution catalyst in direct contact with the surfaces of the BiVO$_4$ particles and an outer layer of a second oxygen evolution catalyst disposed on the inner layer, wherein the first oxygen evolution catalyst is characterized in that it creates fewer interfacial states that can serve as recombination centers at the BiVO$_4$/oxygen evolution catalyst interface than would the second oxygen evolution catalyst and the second oxygen evolution catalyst is characterized in that it has higher catalytic activity for oxygen evolution than does the first oxygen evolution catalyst.

11. The electrode of claim 10, wherein the first oxygen evolution catalyst is FeO$_x$(OH)$_y$ (0≤x≤1.5, 0≤y≤3, where at least one of x and y has a value >0) and the second oxygen evolution catalyst is NiO$_x$(OH)$_y$ (0≤x≤1.5, 0≤y≤3, where at least one of x and y has a value >0).

12. An electrode comprising BiVO$_4$ particles and a coating of oxygen evolution catalyst on the surfaces of the BiVO$_4$ particles, wherein the coating of oxygen evolution catalyst comprises an inner layer of a first oxygen evolution catalyst in direct contact with the surfaces of the BiVO$_4$ particles and an outer layer of a second oxygen evolution catalyst disposed on the inner layer, wherein the first oxygen evolution catalyst is characterized in that it creates fewer interfacial states that can serve as recombination centers at the BiVO$_4$/oxygen evolution catalyst interface than would the second oxygen evolution catalyst and the second oxygen evolution catalyst is characterized in that it has higher catalytic activity for oxygen evolution than does the first oxygen evolution catalyst.

13. The material of claim 12, wherein the first oxygen evolution catalyst is FeO$_x$(OH)$_y$ (0≤x≤1.5, 0≤y≤3, where at least one of x and y has a value >0) and the second oxygen evolution catalyst is NiO$_x$(OH)$_y$ (0≤x≤1.5, 0≤y≤3, where at least one of x and y has a value >0).

14. A photoelectrochemical cell comprising:
a working electrode comprising a porous network of connected BiVO$_4$ particles, including BiVO$_4$ particles that are merged at their interfaces, wherein the porous network has a surface area of at least about 20 m$^2$/g, as measured by the Brunauer-Emmett-Teller method, and further wherein the working electrode is characterized in that it generates a photocurrent density of at least 0.2 mA/cm$^2$ at 1 V versus reversible hydrogen electrode for water oxidation under 100 mW/cm$^2$, AM 1.5 G illumination;
a counter electrode in electrical communication with the working electrode; and
an electrolyte solution in which the working electrode and the counter electrode are immersed.

15. A method for electrochemical reactions using a photoelectrochemical cell comprising: a working electrode comprising a porous network of connected BiVO$_4$ particles, including BiVO$_4$ particles that are merged at their interfaces, wherein the porous network has a surface area of at least about 20 m$^2$/g, as measured by the Brunauer-Emmett-Teller method, and further wherein the working electrode is characterized in that it generates a photocurrent density of at least 0.2 mA/cm$^2$ at 1 V versus reversible hydrogen electrode for water oxidation under 100 mW/cm$^2$, AM 1.5 G illumination; a counter electrode in electrical communication with the working electrode; and an electrolyte solution in which the working electrode and the counter electrode are immersed, the method comprising:
exposing the BiVO$_4$ electrode to radiation having energy greater than the bandgap of the BiVO$_4$, such that: the BiVO$_4$ particles absorb the radiation to produce electron-hole pairs; the holes are transported to the electrolyte-BiVO$_4$ interface where they undergo oxidation reactions with the electrolyte; and the electrons are transported to the counter electrode where they undergo reduction reactions with the electrolyte.

16. The method of claim 15, wherein the electrolyte solution is an aqueous electrolyte solution; the holes at the electrolyte-BiVO$_4$ interface oxidize water in the aqueous electrolyte solution to form O$_2$; and the electrons at the counter electrode reduce water in the aqueous electrolyte solution to form H$_2$.

17. A method of making an electrode, the method comprising:
applying an organic solution comprising vanadium-containing precursor molecules to the surface of an electrode comprised of plate-like BiOX crystals, where X represents a halogen atom or a mixture of halogen atoms; and
heating the organic solution-covered electrode comprised of plate-like BiOX crystals to form an electrode comprising a porous network of connected BiVO$_4$ particles, including BiVO$_4$ particles that are merged at their interfaces;
wherein the porous network of connected BiVO$_4$ particles has a surface area of at least about 20 m$^2$/g, as measured by the Brunauer-Emmett-Teller method, and further wherein the electrode is characterized in that it generates a photocurrent density of at least 0.2 mA/cm$^2$ at 1 V versus reversible hydrogen electrode for water oxidation under 100 mW/cm$^2$, AM 1.5 G illumination.

18. The method of claim 17, where X represents iodine.

19. The method of claim 17, further comprising applying a coating of an oxygen evolution catalyst to the surface of the porous network of connected $BiVO_4$ particles.

20. The method of claim 17, further comprising exposing the porous network of connected $BiVO_4$ particles to an elevated temperature in a reducing or inert atmosphere to create oxygen vacancies in the $BiVO_4$.

* * * * *

UNITED STATES PATENT AND TRADEMARK OFFICE
CERTIFICATE OF CORRECTION

PATENT NO. : 9,856,567 B2  
APPLICATION NO. : 14/305064  
DATED : January 2, 2018  
INVENTOR(S) : Kyoung-Shin Choi et al.

Page 1 of 1

It is certified that error appears in the above-identified patent and that said Letters Patent is hereby corrected as shown below:

In the Claims

Column 17, Line 35, Claim 10:
Delete "$BiVO^4$ particles" and replace with --$BiVO_4$ particles--

Signed and Sealed this
Second Day of October, 2018

Andrei Iancu
*Director of the United States Patent and Trademark Office*